United States Patent
Suh

(10) Patent No.: US 12,294,935 B2
(45) Date of Patent: May 6, 2025

(54) APPARATUS AND METHOD FOR PROVIDING SECURITY IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 17/795,107

(22) PCT Filed: Jan. 22, 2021

(86) PCT No.: PCT/KR2021/000907
§ 371 (c)(1),
(2) Date: Jul. 25, 2022

(87) PCT Pub. No.: WO2021/150059
PCT Pub. Date: Jul. 29, 2021

(65) Prior Publication Data
US 2023/0086538 A1    Mar. 23, 2023

(30) Foreign Application Priority Data
Jan. 23, 2020   (KR) .................. 10-2020-0009393

(51) Int. Cl.
*H04W 48/04* (2009.01)
*H04W 60/00* (2009.01)

(52) U.S. Cl.
CPC ........... *H04W 48/04* (2013.01); *H04W 60/00* (2013.01)

(58) Field of Classification Search
CPC ..... H04W 12/08; H04W 12/60; H04W 48/04; H04W 60/00
See application file for complete search history.

(56) References Cited

U.S. PATENT DOCUMENTS 11,197,273 B2 * 12/2021 Park ..................... H04W 72/20
11,356,893 B2    6/2022 Youn et al.
(Continued)

FOREIGN PATENT DOCUMENTS

| CN | 110536293 A | 12/2019 |
| JP | 2019-062443 A | 4/2019 |

(Continued)

OTHER PUBLICATIONS

U.S. Appl. No. 62/861,773 (Year: 2019).*
(Continued)

*Primary Examiner* — Dung B Huynh
(74) *Attorney, Agent, or Firm* — Jefferson IP Law, LLP

(57) ABSTRACT

Provided are an apparatus and method for providing security in a wireless communication system. A user equipment (UE) may transmit a registration request message to an access and mobility management function (AMF), in response to reception of a registration reject message from the AMF, transmit an attach request to a mobility management entity (MME), and receive an attach accept from the MME, wherein, when the AMF and the UE have a security context, a security-protected registration reject message may be transmitted by the AMF to the UE, a registration request from the UE may be redirected from the AMF to the MME, and when at least one of the AMF and the UE does not have security context information, the attach request may include security verification information.

16 Claims, 3 Drawing Sheets

(56) References Cited

U.S. PATENT DOCUMENTS

| | | | |
|---|---|---|---|
| 11,902,878 B2* | 2/2024 | Tiwari | H04W 48/02 |
| 11,930,549 B2 | 3/2024 | Takakura | |
| 2012/0178449 A1 | 7/2012 | Liao | |
| 2019/0029065 A1 | 1/2019 | Park et al. | |
| 2019/0254089 A1 | 8/2019 | Huang-Fu et al. | |
| 2020/0015079 A1 | 1/2020 | Li et al. | |
| 2020/0314701 A1* | 10/2020 | Talebi Fard | H04W 36/0016 |
| 2020/0314731 A1* | 10/2020 | Ryu | H04W 64/003 |
| 2020/0329524 A1* | 10/2020 | Park | H04W 48/16 |
| 2020/0351755 A1* | 11/2020 | Huang-Fu | H04W 8/186 |
| 2020/0389835 A1* | 12/2020 | Talebi Fard | H04W 48/04 |
| 2020/0413241 A1 | 12/2020 | Park et al. | |
| 2021/0051566 A1* | 2/2021 | Tiwari | H04W 8/08 |
| 2021/0058784 A1* | 2/2021 | Kedalagudde | H04W 76/12 |
| 2021/0092707 A1* | 3/2021 | Ryu | H04W 84/045 |
| 2021/0092708 A1* | 3/2021 | Ryu | H04W 76/27 |
| 2021/0092725 A1* | 3/2021 | Park | H04W 76/27 |
| 2022/0078700 A1* | 3/2022 | Minokuchi | H04W 48/14 |
| 2022/0201482 A1* | 6/2022 | Ferdi | H04W 12/08 |
| 2022/0225098 A1* | 7/2022 | Guo | H04W 48/08 |
| 2022/0225272 A1* | 7/2022 | Yang | H04W 68/02 |
| 2022/0286922 A1 | 9/2022 | Chen et al. | |
| 2023/0023639 A1* | 1/2023 | Shi | H04W 88/04 |
| 2024/0172087 A1* | 5/2024 | Tiwari | H04W 76/18 |

FOREIGN PATENT DOCUMENTS

| | | |
|---|---|---|
| JP | 2019-220878 A | 12/2019 |
| KR | 10-2012-0081572 A | 7/2012 |
| KR | 10-2018-0005551 A | 1/2018 |
| WO | 2018/138379 A1 | 8/2018 |
| WO | 2019/135560 A1 | 7/2019 |
| WO | 2019/160390 A1 | 8/2019 |

OTHER PUBLICATIONS

Change Request—195189 (Year: 2019).*
TS 24.501 V16.2.0 (Year: 2019).*
3GPP; TSG SA, 'Study on security for 5GS enhanced support of Vertical and LAN Services; (Release 16)', 3GPP TR 33.819 V16.0.0, Dec. 31, 2019.
3GPP; TSG SA, 'System architecture for the 5G System (5GS); Stage 2 (Release 16)', 3GPP TS 23.501V16.3.0, Dec. 22, 2019.
3GPP; TSG CT, 'Non-Access-Stratum (NAS) protocol for 5G System (5GS); Stage 3 (Release 16)', 3GPPTS 24.501 V16.3.0, Dec. 20, 2019.
Nokia, Nokia Shanghai Bell; 5GMM cause value for Cag; 3GPP TSG CT WG1 Meeting #116; C1-192813; Apr. I12, 2019, Xi'an, P.R. of China.
Extended European Search Report dated Apr. 28, 2023, issued in a European Patent Application No. 21745028.7.
Chinese Office Action dated Jun. 3, 2024, issued in a Chinese Patent Application No. 202180010565.6.
Korean Notice of Allowance dated Oct. 26, 2024, issued in Korean Application No. 10-2020-0009393.
Chinese Office Action dated Nov. 5, 2024, issued in Chinese Application No. 202180010565.6.
European Office Action dated Dec. 16, 2024, issued in European Application No. 21745028.7.

* cited by examiner

APPARATUS AND METHOD FOR PROVIDING SECURITY IN WIRELESS COMMUNICATION SYSTEM

TECHNICAL FIELD

The disclosure relates to an apparatus and method for providing security in a wireless communication system. In detail, the disclosure relates to an apparatus and method for providing security by using a NAS message in a wireless communication system.

BACKGROUND

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called as beyond 4G network communication systems or post long term evolution (LTE) systems. The 5G communication system defined by the $3^{rd}$ Generation Partnership Project (3GPP) is called a new radio (NR) system.

In order to achieve a high data rate, consideration is given to implementing 5G communication systems in ultra-high frequency (millimeter-wave (mmWave)) bands (e.g., 60 GHz bands). To reduce path loss of radio waves and increase transmission distances of radio waves in an ultra-high frequency band, technologies, such as beamforming, massive multi-input multi-output (MIMO), full dimensional MIMO (FD-MIMO), array antenna, analog beamforming, and large-scale antenna system, are applied to radio wave transmission/reception.

Also, in order to improve networks of systems, for 5G communication systems, development of technologies such as evolved small cells, advanced small cells, cloud radio access networks (cloud RANs), ultra-dense networks, device-to-device (D2D) communication, wireless backhaul, moving networks, cooperative communication, coordinated multi-points (CoMP), and received-interference cancellation is underway. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The disclosure relates to an apparatus and method for providing security in a wireless communication system.

DESCRIPTION OF EMBODIMENTS

Technical Problem

The disclosure relates to an apparatus and method for providing security in a wireless communication system.

Solution to Problem

According to an embodiment of the disclosure, a user equipment (UE) may transmit a registration request message to an access and mobility management function (AMF), in response to reception of a registration reject message from the AMF, transmit an attach request to a mobility management entity (MME), and receive an attach accept from the MME, wherein, when the AMF and the UE have a security context, a security-protected registration reject message may be transmitted by the AMF to the UE, a registration request from the UE may be redirected from the AMF to the MME, and when at least one of the AMF and the UE does not have security context information, the attach request may include security verification information.

Advantageous Effects of Disclosure

According to an embodiment of the disclosure, security may be enhanced in a wireless communication system.

BEST MODE

Figure 1:
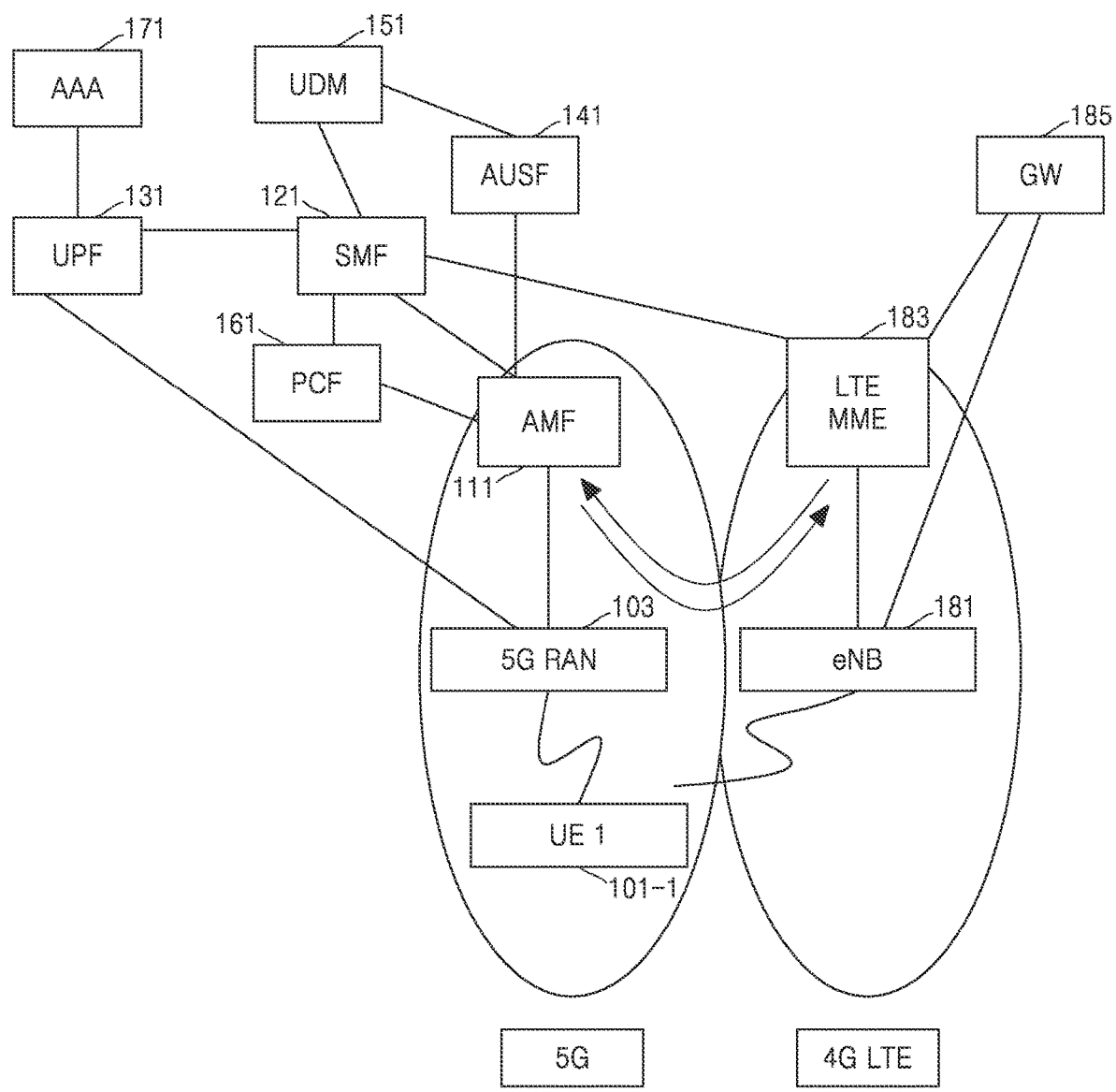
FIG. 1 is a diagram for describing a structure in a wireless communication system according to an embodiment of the disclosure.

According to an embodiment of the disclosure, a user equipment (UE) for performing communication in a wireless communication system includes a transceiver, and at least one processor configured to transmit a registration request to an access and mobility management function (AMF) through the transceiver, in response to the UE not being allowed to a closed access group, receive a registration reject message from the AMF through the transceiver, and obtain closed access group (CAG) information included in the received registration reject message.

According to an embodiment of the disclosure, in the UE for performing communication in the wireless communication system, the registration reject message may include a code value indicating that the UE not being allowed to the CAG is a reason for rejection of registration.

According to an embodiment of the disclosure, in the UE for performing communication in the wireless communication system, the at least one processor may be further configured to update CAG information stored in the UE with the CAG information included in the received registration reject message.

According to an embodiment of the disclosure, in the UE for performing communication in the wireless communication system, the obtained CAG information may include information regarding a CAG that is allowed for the UE.

According to an embodiment of the disclosure, in the UE for performing communication in the wireless communication system, the obtained CAG information may include information regarding a CAG that is not allowed for the UE.

According to an embodiment of the disclosure, an access and mobility management function (AMF) for performing communication in a wireless communication system includes a transceiver, and at least one processor configured to receive, from a user equipment (UE), a registration request message through the transceiver, identify whether the UE is allowed to a CAG, and in response to the UE not being allowed to the CAG, transmit a registration reject message to the UE through the transceiver, the registration reject message including CAG information.

According to an embodiment of the disclosure, in the AMF for performing communication in the wireless communication system, the registration reject message may include a code value indicating that the UE not being allowed to the CAG is a reason for rejection of registration.

According to an embodiment of the disclosure, in the AMF for performing communication in the wireless communication system, CAG information stored in the UE may be updated with the CAG information included in the received registration reject message.

According to an embodiment of the disclosure, in the AMF for performing communication in the wireless communication system, the obtained CAG information may include information regarding a CAG that is allowed for the UE.

According to an embodiment of the disclosure, in the AMF for performing communication in the wireless communication system, the obtained CAG information may include information regarding a CAG that is not allowed for the UE.

MODE OF DISCLOSURE

Hereinafter, embodiments of the disclosure will be described in detail with reference to the accompanying drawings. In the following descriptions of embodiments, descriptions of techniques that are well known in the art and are not directly related to the disclosure are omitted. This is intended to prevent the unnecessary descriptions from obscuring the subject matters of the disclosure and to further clearly describe the gist of the disclosure.

For the same reasons, components may be exaggerated, omitted, or schematically shown in drawings for clarity. Also, the size of each component does not entirely reflect the actual size. In each drawing, components that are the same or are in correspondence are rendered the same reference numeral.

The advantages and features of the disclosure and methods of achieving them will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that the disclosure will be thorough and complete, and will fully convey the concept of the disclosure to those of ordinary skill in the art. The scope of the disclosure is only defined in the claims. Throughout the specification, the same components are denoted by the same reference numerals.

In this regard, it will be understood that combinations of blocks in flowcharts or process flow diagrams may be performed by computer program instructions.

In addition, each block of the flowchart illustrations may represent a module, segment, or portion of code, which includes one or more executable instructions for implementing specified logical function(s). It should also be noted that in some alternative implementations, the functions noted in the blocks may occur out of the order. For example, two blocks shown successively may actually be executed substantially concurrently, or the blocks may sometimes be performed in a reverse order according to the corresponding function.

The term 'unit' or ' . . . er/or' as used in the present embodiment refers to a software or hardware component, such as field programmable gate array (FPGA) or application specific integrated circuit (ASIC), which performs some functions. However, the term 'unit' or ' . . . er/or' is not limited to software or hardware. The term 'unit' or ' . . . er/or' may be configured in an addressable storage medium or may be configured to reproduce one or more processors. Thus, for example, the term 'units' or ' . . . ers/ors' may refer to components such as software components, object-oriented software components, class components, and task components, and may include processes, functions, attributes, procedures, subroutines, segments of program code, drivers, firmware, micro code, circuits, data, a database, data structures, tables, arrays, or variables. The functionality provided in components and 'units' or ' . . . ers/ors' may be combined into fewer components and 'units' or ' . . . ers/ors' may be further separated into additional components and 'units' or ' . . . ers/ors'. Further, the components and 'units' or ' . . . ers/ors' may be implemented to operate one or more central processing units (CPUs) in a device or a secure multimedia card. Also, according to an embodiment, a 'unit' or ' . . . er/or' may include one or more processors.

Herein, terms to identify access nodes, terms to refer to network entities or terms to refer to network functions, terms to refer to messages, terms to refer to interfaces among network entities, terms to refer to various types of identification information, etc. are examples for convenience of explanation. Accordingly, the disclosure is not limited to terms to be described below, and other terms indicating objects having equal technical meanings may be used.

In the following description, terms and names defined in the 3rd Generation Partnership Project (3GPP) long term evolution (LTE) standards, or terms and names modified based on the terms and names defined in the 3GPP LTE standards may be used for convenience of description. However, the disclosure is not limited to the aforementioned terms and names, and may be equally applied to systems conforming to other standards. In the disclosure, an eNode B (eNB) may be interchangeably used with a gNode B (gNB) for convenience of descriptions. That is, a base station (BS) described as an eNB may represent a gNB. In the disclosure, the term "terminal" may refer to various wireless communication devices as well as mobile phones, narrowband-Internet of things (NB-IoT) devices, and sensors.

Although embodiments of the disclosure will be primarily focused on communication standards defined by the 3GPP, the subject matter of the disclosure may also be applicable to other communication systems with a similar technical background with minor changes without significantly departing from the scope of the disclosure, which may be possible under the determination of those of ordinary skill in the art to which the disclosure pertains.

In a 5G or new radio (NR) system, an entity is separated into an access and mobility management function (AMF), which is a management entity for managing mobility of a terminal, and a session management function (SMF), which is an entity for managing a session. For this reason, unlike a $4^{th}$ generation (4G) LTE communication system in which a mobility management entity (MME) performs mobility management and session management together, in the 5G or NR system, an entity for performing mobility management and an entity for performing session management are separate, and accordingly, a communication method between the terminal and the network entities and a communication management method may be changed.

In the 5G or NR system, with respect to a case where the terminal accesses a network through non-3GPP access, mobility management may be performed by the AMF and session management may be performed by the SMF via a non-3GPP interworking function (N3IWF). Also, the AMF may process security-related information, which is an important element in mobility management.

As described above, in a 4G LTE system, the MME is responsible for both mobility management and session management. The 5G or NR system may support a non-stand-alone architecture in which communication is performed by co-using the network entities of the 4G LTE system.

The disclosure provides a method and apparatus of enhancing security and efficiently performing communication.

FIG. 1 is a diagram for describing a structure in a wireless communication system according to an embodiment of the disclosure.

Referring to FIG. 1, a 5G or NR core network may include network functions (NFs), such as a user plane function (UPF) 131, an SMF 121, an AMF 111, a 5G radio access network (RAN) 103, a user data management (UDM) 151, and a policy control function (PCF) 161.

Also, in order to authenticate entities corresponding to theses NFs, the 5G or NR core network may include entities, such as an authentication server function (AUSF) 141 and an authentication, authorization and accounting (AAA) 171.

When a user equipment (UE) (or terminal) 101-1 performs communication through 3GPP access, the UE 101-1 may access the 5G core network through the 5G RAN (or BS) 103 or 103-2. In addition, when the UE 101-1 performs communication through non-3GPP access, a N3IWF is present, and session management may be controlled by the UE, the non-3GPP access, the N3IWF, and the SMF, and mobility management may be controlled by the UE, the non-3GPP access, the N3IWF, and the AMF.

In the 5G or NR system, an entity for performing mobility management and session management may be separated into the AMF 111 and the SMF 121. In addition, the 5G or NR system may support a stand-alone deployment structure for performing communication only with 5G or NR entities, and a non-stand-alone deployment structure co-using a 4G entity and 5G or NR entities.

As shown in FIG. 1, when the UE communicates with a network, deployment in which control is performed by an eNB and a 5G entity of a core network is used may be possible. In this case, mobility management between the UE and the AMF, and session management between the UE and the SMF may be performed in a non-access stratum (NAS) layer, which is a layer 3. In addition, a message related to an access stratum (AS), which is a layer 2, may be transmitted between the UE and the eNB. Accordingly, when the UE 101-1 accesses each of the 5G RAN 103 and an eNB 181, a method of generating and managing a security context is required. Accordingly, in the disclosure, generation and management of a security context, and protocol exchange, which are applicable to such a deployment situation, will be described.

Although it is assumed that a communication network on which the disclosure is based is a 5G network or a 4G LTE network, this disclosure may be applied when the same concept is applied to other systems within a range that may be understood by a person of ordinary skill in the art.

Referring to FIG. 1, according to an embodiment, when a registration request message is transmitted by the UE 101-1 to the AMF 111 but registration is not performed by the AMF 111, for a corresponding registration process, an attach request process may be processed at an MME 183 of 4G LTE rather than the AMF 111. In the case of such a redirection, information that is not security-protected is redirected, which may result in a security problem. Also, in this case, a security protection process, such as a security mode command process required for security protection, may have not yet occurred, and thus, security protection may not be effectively performed. Accordingly, the disclosure is intended to solve such problems.

Figure 2:
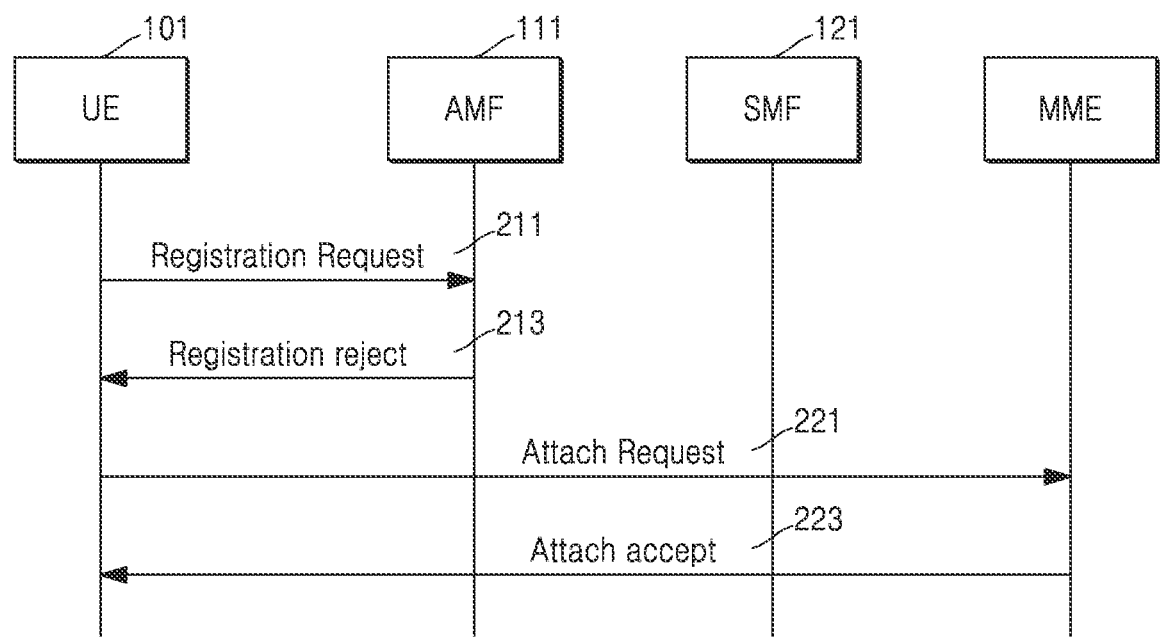
FIG. 2 is a flowchart for describing a procedure for performing communication by using a NAS message in a $5^{th}$ generation (5G) network environment, according to an embodiment of the disclosure.

FIG. 2 is a flowchart for describing a procedure for performing communication by using a NAS message in a 5G network environment, according to an embodiment of the disclosure.

An embodiment of the disclosure is to solve a security problem that occurs because a registration-related message is not security-protected.

According to an embodiment, when a registration request message is transmitted by a UE to an AMF but registration is not performed by the AMF, for a corresponding registration process, an attach request process may be performed with respect to an MME of 4G LTE rather than the AMF. In the case of such a redirection, information that is not security-protected is redirected, which may result in a security problem. Also, in this case, a security protection process, such as a security mode command process required for security protection, may have not yet occurred, and thus, security protection may not be effectively performed. Accordingly, the disclosure is intended to solve such problems.

In operation 211, a UE may transmit a registration request message to an AMF.

In operation 213, the AMF may transmit a registration reject message to the UE.

For example, when the AMF is not able to accept registration of the UE, the AMF may transmit the registration reject message to the UE.

The registration reject message may include at least one of pieces of information listed in Table 1.

TABLE 1

| | | Registration reject message | | | |
|---|---|---|---|---|---|
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration reject message identity | Message type 9.7 | M | V | 1 |
| | 5GMM cause | 5GMM cause 9.11.3.2 | M | V | 1 |
| 5F | T3346 value | GPRS timer 2 9.11.2.4 | O | TLV | 3 |
| 16 | T3502 value | GPRS timer 2 9.11.2.4 | O | TLV | 3 |
| 78 | EAR message | EAP message 9.11.2.2 | O | TLV-E | 7-1503 |
| 69 | Rejected NSSAI | Rejected NSSAI 9.11.3.46 | O | TLV | 4-42 |

The registration reject message may be transmitted as follows.

According to a first embodiment, in a case where a UE and a network have a security context, an AMF may process a registration reject message to be security-protected, and transmit the registration reject message to the UE. According to an embodiment, the registration reject message may also be integrity-protected, ciphered (encoded), or integrity-protected and ciphered, and then transmitted.

When the security-protected message is received, the UE with the security context may redirect such a registration request to an LTE network, and in operation 221, may transmit an attach request message to an MME.

According to a second embodiment, in a case where a UE and a network do not have a security context, when a registration reject message is received and a registration request is redirected to an LTE network, the UE may transmit an attach request message including security verification information so that an MME may verify whether the UE is valid.

According to a third embodiment (a modification of the first embodiment), in a case where a UE and a network have a security context, when the UE transmits a registration request message to an AMF in operation 211, the UE may transmit information required for message routing as clear text, that is, unencrypted information, and in the case of information that requires security, in order to enhance security, the UE may cipher (encode) a NAS message container, while an entire NAS message is included in the NAS message container, and transmitted. Accordingly, when the AMF transmits a registration reject to the UE, in a case where a security context is present, at least one of information elements (IEs), e.g., T3346 value, T3502 value, EAP message, and rejected NSSAI information, in the registration reject may be ciphered by using the security context, and transmitted.

According to a fourth embodiment (a modification of the second embodiment), in a case where a UE or a network does not have a security context, in a registration request transmitted by the UE to an AMF, information used for minimal routing may be transmitted as a clear text IE, that is, unencrypted information. In addition, because a registration request message is not secure, the UE and the AMF may have a security context after a procedure of transmitting a security mode command message. That is, after the UE receives the security mode command transmitted by the AMF to the UE, an entire initial NAS message may be included in a NAS message container IE, and transmitted, while a NAS message container IE is included in a security mode complete message to be transmitted by the UE to the AMF, and transmitted. The security mode complete message may be ciphered. Accordingly, a registration accept, which is a response to the registration request before the security mode complete message is transmitted, or a registration reject message according to an embodiment of the disclosure may not be ciphered. Therefore, according to an embodiment, when the AMF is to transmit a registration reject message to the UE, information required for security verification may also be loaded and transmitted, so that the UE may use the information for security verification in LTE at a later time.

In operation 221, the UE may transmit an attach request message to the MME.

In operation 223, the MME may transmit an attach accept message to the UE.

Figure 3:
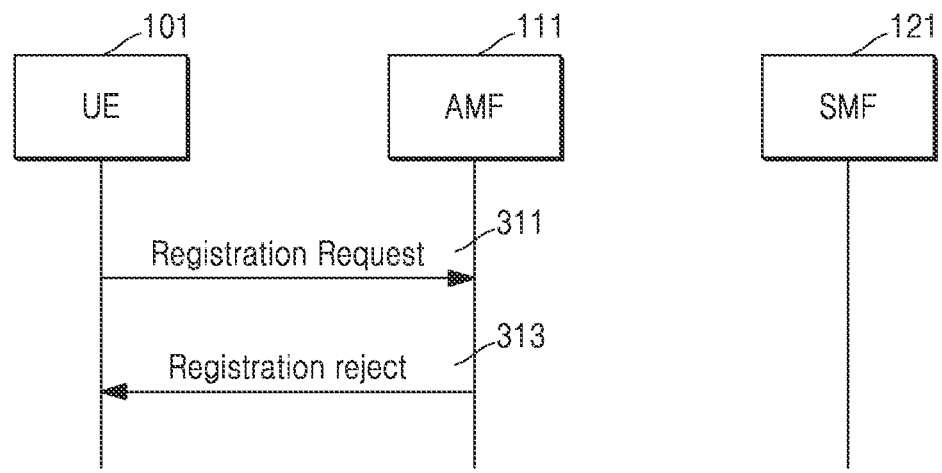
FIG. 3 is a flowchart for describing a procedure for performing communication by using a NAS message in a 5G network environment, according to an embodiment of the disclosure.

FIG. 3 is a flowchart for describing a procedure for performing communication by using a NAS message in a 5G network environment, according to an embodiment of the disclosure.

In operation 311, the UE may transmit a registration request message to the AMF.

However, when the UE does not belong to a corresponding network, and the UE is not able to access a corresponding closed access group (CAG), the AMF needs to inform the UE that the UE is not allowed to access the CAG. The CAG is a closed access group, and accordingly, access control may be performed by identifying whether the CAG is a network that the UE may access.

In operation 313, the AMF may transmit a registration reject message to the UE.

The registration reject message may include at least one of pieces of information listed in Table 2 below.

According to an embodiment, in order to inform the UE that the UE is not allowed to a specific CAG, the AMF may transmit, to the UE, information regarding a CAG that is not allowed.

According to another embodiment, the AMF may also inform the UE of information regarding a CAG that is allowable for the UE, and allow the UE to attempt access with the information.

TABLE 2

| | | Registration reject message | | | |
|---|---|---|---|---|---|
| IEI | Information Element | Type/Reference | Presence | Format | Length |
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration reject message identity | Message type 9.7 | M | V | 1 |
| | 5GMM cause | 5GMM cause 9.11.3.2 | M | V | 1 |
| 5F | T3346 value | GPRS timer 2 9.11.2.4 | O | TLV | 3 |
| 16 | T3502 value | GPRS timer 2 9.11.2.4 | O | TLV | 3 |
| 78 | EAP message | EAP message 9.11.2.2 | O | TLV-E | 7-1503 |
| 69 | Rejected NSSAI GAG | Rejected NSSAI 9.11.3.46 | O | TLV | 4-42 |

Figure 4:
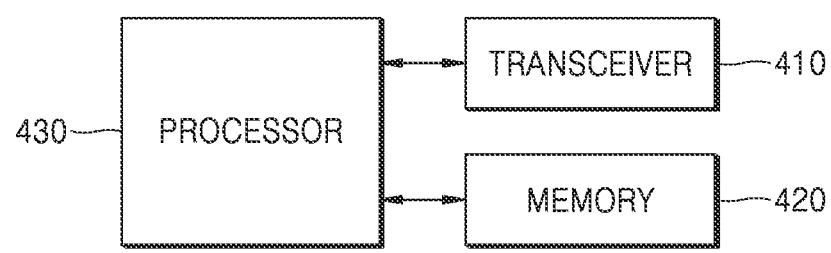
FIG. 4 is a diagram illustrating a configuration of a user equipment (UE) according to an embodiment of the disclosure.

FIG. 4 is a diagram illustrating a configuration of a UE according to an embodiment of the disclosure.

As shown in FIG. 4, the UE of the disclosure may include a transceiver 410, a memory 420, and a processor 430. The processor 430, the transceiver 410, and the memory 420 of the UE may operate according to the aforementioned communication method by the UE. However, the components of the UE are not limited to the aforementioned example. For example, the UE may include more components than the aforementioned components or may include fewer components than the aforementioned components. In addition, the processor 430, the transceiver 410, and the memory 420 may be implemented in a single chip.

The transceiver 410 is a collective term of a UE transmitted and a UE receiver, and may transmit or receive signals to or from a BS or a network entity. The signals transmitted to or received from the BS may include control information and data. For this, the transceiver 410 may include an RF transmitter for up-converting the frequency of a signal to be transmitted and amplifying the signal and an RF receiver for low-noise amplifying a received signal and down-converting the frequency of the received signal. However, this is merely an example of the transceiver 410, and the components of the transceiver 410 are not limited to the RF transmitter and RF receiver.

Also, the transceiver 410 may include a wired/wireless transceiver and may include various components for transmitting or receiving signals.

Furthermore, the transceiver 410 may receive a signal through a wireless channel, output the received signal to the processor 430, and transmit a signal output from the processor 430 through a wireless channel.

In addition, the transceiver 410 may receive a communication signal and output the communication signal to a processor, and may transmit a signal output from the processor to a network entity through a wired/wireless network.

The memory 420 may store programs and data required for operations of the UE. Also, the memory 420 may store control information or data included in a signal obtained by the UE. The memory 420 may include a storage medium, such as a read-only memory (ROM), a random access memory (RAM), a hard disk, a compact disk (CD)-ROM, and a digital versatile disc (DVD), or a combination of storage media.

The processor 430 may control a series of processes for the UE to operate according to the aforementioned embodiments of the disclosure. The processor 430 may include at least one or more processors. For example, the processor 430 may include a communication processor (CP) for performing control for communication and an application processor (AP) for controlling a higher layer such as an application program.

Figure 5:
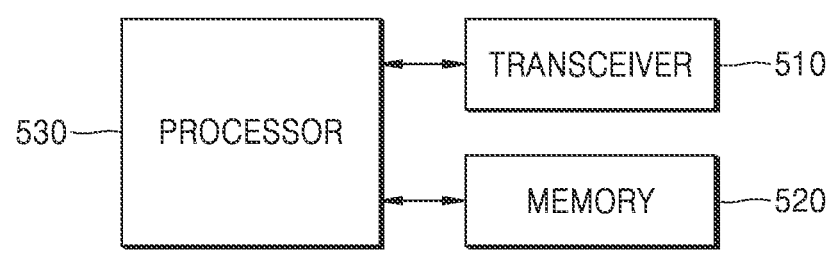
FIG. 5 is a diagram illustrating a configuration of a network entity according to an embodiment of the disclosure.

FIG. 5 is a diagram illustrating a configuration of a network entity according to an embodiment of the disclosure.

As shown in FIG. 5, the network entity of the disclosure may include a transceiver 510, a memory 520, and a processor 530. The processor 530, the transceiver 510, and the memory 520 of the network entity may operate according to the aforementioned communication method by the network entity. However, the components of the network entity are not limited to the aforementioned example. For example, the network entity may include more components than the aforementioned components or may include fewer components than the aforementioned components. In addition, the transceiver 510, the memory 520, and the processor 530 may be implemented in a single chip. The network entity may include NFs, such as an AMF, an SMF, a PCF, a network exposure function (NEF), a UDM, and a UPF, as described above. Also, the network entity may include a BS.

The transceiver 510 is a collective term of a receiver of a network entity and a transmitter of a network entity, and may transmit or receive signals to or from the UE or another network entity. In this case, the transmitted to or received signals may include control information and data. For this, the transceiver 510 may include an RF transmitter for up-converting the frequency of a signal to be transmitted and amplifying the signal and an RF receiver for low-noise amplifying a received signal and down-converting the frequency of the received signal. However, this is merely an example of the transceiver 510, and the components of the transceiver 510 are not limited to the RF transmitter and RF receiver. The transceiver 510 may include a wired/wireless transceiver and may include various components for transmitting or receiving signals.

Also, the transceiver 510 may receive a signal through a communication channel (e.g., a wireless channel) and output the signal to the processor 530, and may transmit a signal output from the processor 530 through a wireless channel.

In addition, the transceiver 510 may receive a communication signal and output the communication signal to a processor, and may transmit a signal output from the processor to a UE or a network entity through a wired/wireless network.

The memory 520 may store programs and data required for operations of the network entity. Also, the memory 520 may store control information or data included in a signal obtained by the network entity. The memory 520 may include a storage medium, such as a ROM, a RAM, a hard disk, a CD-ROM, and a DVD, or a combination of storage media.

The processor 530 may control a series of processes for the network entity to operate according to the aforementioned embodiments of the disclosure. The processor 530 may include at least one or more processors. The methods according to the claims of the disclosure or the embodiments described herein may be implemented as hardware, software, or a combination of hardware and software.

When the methods are implemented as software, a computer-readable recording medium having one or more programs (software modules) stored therein may be provided. One or more programs stored in the computer-readable storage medium are configured to be executable by one or more processors in an electronic device. The one or more programs include instructions that cause the electronic device to execute the methods according to the claims of the disclosure or the embodiments described herein.

The programs (e.g., software modules or software) may be stored in a RAM, a non-volatile memory including a flash memory, a ROM, an electrically erasable programmable read-only memory (EEPROM), a magnetic disc storage device, a CD-ROM, a DVD, another type of optical storage device, or a magnetic cassette. Alternatively, the programs may be stored in a memory including any combination of some or all of the aforementioned storage media. Also, each of the memories may include a plurality of memories.

The programs may also be stored in an attachable storage device which is accessible through a communication network, such as the Internet, an intranet, a local area network (LAN), a wide area network (WAN), or a storage area network (SAN), or a combination thereof. The storage device may access, through an external port, an apparatus performing the embodiments of the disclosure. Furthermore, a separate storage device on the communication network may access the apparatus performing the embodiments of the disclosure.

In the aforementioned embodiments of the disclosure, components included in the disclosure are expressed in a singular or plural form according to the embodiments of the disclosure. However, the singular or plural form is appropriately selected for convenience of descriptions and the disclosure is not limited thereto. As such, a component expressed in a plural form may also be configured as a single component, and a component expressed in a singular form may also be configured as plural components.

Although specific embodiments have been described in the detailed description of the disclosure, various modifications may be made without departing from the scope of the disclosure. Therefore, the scope of the disclosure should not be limited to the aforedescribed embodiments of the disclosure and should be determined by the appended claims and the equivalents thereof.

The invention claimed is:

1. A user equipment (UE) for performing communication in a wireless communication system, the UE comprising:
   a transceiver; and
   at least one processor configured to:
      transmit a registration request to an access and mobility management function (AMF) through the transceiver, and
      in case that the UE is not allowed to a closed access group (CAG), receive a registration reject message from the AMF through the transceiver,
   wherein the registration reject message includes an information element (IE) of a 5GMM cause and an IE of CAG information, and
   wherein the IE of CAG information includes information associated with a CAG that is not allowed to the UE.

2. The UE of claim 1, wherein the IE of the 5GMM cause comprises a code value indicating that the UE not being allowed to the CAG is a reason for rejection of registration.

3. The UE of claim 1, wherein the at least one processor is further configured to:
   update CAG information stored in the UE based on the IE of CAG information included in the received registration reject message.

4. The UE of claim 1, wherein the IE of CAG information comprises information regarding a CAG that is allowed for the UE.

5. An access and mobility management function (AMF) for performing communication in a wireless communication system, the AMF comprising:
   a transceiver; and
   at least one processor configured to:
      receive, from a user equipment (UE), a registration request message through the transceiver,
      identify whether the UE is allowed to a closed access group (CAG), and
      in case that the UE is not allowed to the CAG, transmit a registration reject message to the UE through the transceiver,
   wherein the registration reject message includes an information element (IE) of a 5GMM cause and an IE of CAG information, and
   wherein the IE of CAG information includes information associated with a CAG that is not allowed to the UE.

6. The AMF of claim 5, wherein the IE of the 5GMM cause comprises a code value indicating that the UE not being allowed to the CAG is a reason for rejection of registration.

7. The AMF of claim 5, wherein CAG information stored in the UE is updated based on the IE of CAG information included in the received registration reject message.

8. The AMF of claim 5, wherein the IE of CAG information comprises information regarding a CAG that is allowed for the UE.

9. A method, performed by a user equipment (UE), of performing communication in a wireless communication system, the method comprising:
   transmitting a registration request message to an access and mobility management function (AMF); and
   in case that the UE is not allowed to a closed access group (CAG), receiving a registration reject message from the AMF,
   wherein the registration reject message includes information element (IE) of a 5GMM cause and IE of CAG information, and
   wherein the IE of CAG information includes information associated with a CAG that is not allowed to the UE.

10. The method of claim 9, further comprising:
    updating CAG information stored in the UE based on the IE of CAG information included in the received registration reject message.

11. The method of claim 9, wherein the IE of the 5GMM cause comprises a code value indicating that the UE not being allowed to the CAG is a reason for rejection of registration.

12. The method of claim 9, wherein the IE of CAG information comprises information regarding a CAG that is allowed for the UE.

13. A method, performed by an access and mobility management function (AMF), of performing communication in a wireless communication system, the method comprising:
    receiving a registration request message from a user equipment (UE);
    identifying whether the UE is allowed to a closed access group (CAG); and
    in case that the UE is not allowed to the CAG, transmitting a registration reject message to the UE,
    wherein the registration reject message includes an information element (IE) of a 5GMM cause and an IE of CAG information, and
    wherein the IE of CAG information includes information associated with a CAG that is not allowed to the UE.

14. The method of claim 13, wherein CAG information stored in the UE is updated based on the IE of CAG information included in the received registration reject message.

15. The method of claim 13, wherein the IE of the 5GMM cause comprises a code value indicating that the UE not being allowed to the CAG is a reason for rejection of registration.

16. The method of claim 13, wherein the IE of CAG information comprises information regarding a CAG that is allowed for the UE.

* * * * *